United States Patent
Igarashi et al.

(10) Patent No.: US 6,777,117 B1
(45) Date of Patent: Aug. 17, 2004

(54) CATALYSTS FOR WATER GAS SHIFT REACTION, METHOD FOR REMOVING CARBON MONOXIDE IN HYDROGEN GAS AND ELECTRIC POWER-GENERATING SYSTEM OF FUEL CELL

(75) Inventors: Akira Igarashi, Saitama (JP); Hirokazu Higashi, Kanagawa (JP); Manabu Mizobuchi, Hyogo (JP); Noboru Hashimoto, Osaka (JP); Kensaku Kinugawa, Osaka (JP)

(73) Assignee: Matsushita Electric Works, Ltd., Kadoma (JP)

( * ) Notice: Subject to any disclaimer, the term of this patent is extended or adjusted under 35 U.S.C. 154(b) by 0 days.

(21) Appl. No.: 09/720,262

(22) PCT Filed: Mar. 16, 2000

(86) PCT No.: PCT/JP00/01600

§ 371 (c)(1),
(2), (4) Date: Feb. 6, 2001

(87) PCT Pub. No.: WO00/54879

PCT Pub. Date: Sep. 21, 2000

(30) Foreign Application Priority Data

Mar. 18, 1999 (JP) .......................................... 11/073270
Jul. 8, 1999 (JP) .......................................... 11/194104

(51) Int. Cl.[7] .............................. C01B 3/16; H01M 8/04
(52) U.S. Cl. ................... 429/19; 423/247; 423/437.2; 423/655; 423/656; 429/17
(58) Field of Search ................. 423/655, 656; 502/334; 429/17, 19, 247, 437.2

(56) References Cited

U.S. PATENT DOCUMENTS 2,848,377 A * 8/1958 Webb ......................... 502/334
3,415,737 A * 12/1968 Dahl .......................... 502/334
3,755,556 A    8/1973 Aldridge et al.
4,708,946 A   11/1987 Ohata et al.

(List continued on next page.)

FOREIGN PATENT DOCUMENTS

| CA | 911135 | 10/1972 |
| CA | 911136 | 10/1972 |
| CN | 1121701 | 5/1996 |
| DE | 2057839 | 6/1971 |

(List continued on next page.)

OTHER PUBLICATIONS

T. Bunluesin, et al., "Studies of the Water–Gas–Shift Reaction on Ceria–Supported Pt, Pd, and Rh: Implications for Oxygen–Storage Properties", Applied Catalysts B: Environment, vol. 15 (1998), pp. 107–114, XP–002198475, (no month).

D. Wolf, et al., "Kinetic Study of the Water–Gas–Shift Reaction and its Role in the Conversion of Methane of Syngas Over a Pt/MgO Catalyst". Catalysis Today, (1998), pp. 147–156, XP–002198476. (no month).

(List continued on next page.)

*Primary Examiner*—Wayne A. Langel
(74) *Attorney, Agent, or Firm*—Oblon, Spivak, McClelland, Maier & Neustadt, P.C.

(57) ABSTRACT

There is provided a catalyst for a water gas shift reaction in a hydrogen gas which is able to effectively remove CO in the hydrogen gas within a broader temperature range.

Such a catalyst for the water gas shift reaction is characterized in that a metal oxide carrier supports at least platinum. The catalyst can be used for removing carbon monoxide in the hydrogen gas. Particularly, such a catalyst can be used in the water gas shift reaction for removing carbon monoxide in a reformed gas in a fuel cell generation system.

16 Claims, 7 Drawing Sheets

U.S. PATENT DOCUMENTS

| | | | |
|---|---|---|---|
| 5,030,440 A * | 7/1991 | Lywood et al. ............. | 423/656 |
| 5,271,916 A | 12/1993 | Vanderborgh et al. | |
| 5,702,838 A | 12/1997 | Yasumoto et al. | |
| 5,759,950 A * | 6/1998 | Gui et al. .................... | 502/334 |
| 5,962,366 A * | 10/1999 | Zhang ........................ | 502/339 |
| 5,989,457 A | 11/1999 | Seshan et al. | |
| 6,007,700 A | 12/1999 | Alario et al. | |
| 6,069,288 A * | 5/2000 | Ou et al. .................... | 423/656 |
| 6,177,381 B1 * | 1/2001 | Jensen et al. ............... | 502/339 |
| 6,375,924 B1 * | 4/2002 | Towler et al. .............. | 423/656 |

FOREIGN PATENT DOCUMENTS

| | | | |
|---|---|---|---|
| EP | 0 361 648 | | 4/1990 |
| EP | 0 833 402 | | 4/1998 |
| EP | 0 861 802 | | 9/1998 |
| EP | 0 985 635 | | 3/2000 |
| EP | 1 046 612 | | 10/2000 |
| EP | 1 046 612 | A1 | 10/2000 |
| GB | 1 332 349 | | 10/1973 |
| GB | 1 491 499 | | 11/1977 |
| JP | 50-84490 | | 7/1975 |
| JP | 2000-119004 | | 4/2000 |
| JP | 2000-302410 | | 10/2000 |
| KR | 1998-024098 | | 7/1998 |
| WO | WO 97/00305 | | 1/1997 |
| WO | WO 99/15460 | | 4/1999 |

OTHER PUBLICATIONS

Chiou–Hwang Lee, et al., "Effect of Basic Additives on Pt/$Al_2O_3$ for Co and Propylene Oxidation Under Oxygen–Deficient Conditions", Industrial & Engineering Chemistry Research, vol. 36 (1997), pp. 1498–1506, XP–002198477, (no month).

E. Xue, et al., "Water–Gas Shift Conversion Using a Feed With A Low Steam to Carbon Monoxide Ratio and Containing Sulphur", Catalysis Today, vol. 30 (1996), pp. 107–118, XP–002198478, (no month).

B. J. Whittington, et al., "Vehicle Exhaust Catalysis: I. The Relative Importance of Catalytic Oxidation, Steam Reforming and Water–Gas Shift Reactions", Catalysis Today, vol. 26 (1995), pp. 41–45, XP–002198479, (no month).

Chinese Office Action of Jan. 31, 2003 (w/English translation), (no date).

* cited by examiner

CATALYSTS FOR WATER GAS SHIFT REACTION, METHOD FOR REMOVING CARBON MONOXIDE IN HYDROGEN GAS AND ELECTRIC POWER-GENERATING SYSTEM OF FUEL CELL

TECHNICAL FIELD

The present invention relates to a water-gas-shift-reaction catalyst used for converting and removing carbon monoxide (CO) in a gas which is rich in hydrogen through a water gas shift reaction, a method for removing carbon monoxide in a hydrogen gas using such catalyst, and a fuel cell generation system using such catalyst.

BACKGROUND ART

A reformed gas which is rich in hydrogen is produced by a steam reforming reaction of a hydrocarbon gas, liquid or solid, or a fuel such as methanol or the like with steam, and such reformed gas contains carbon monoxide as a by-product. The reformed gas is used for a supply of hydrogen as a fuel in a fuel cell electricity generation system.

It is contemplated that among fuel cells, a polymer electrolyte fuel cell (or solid polymer fuel cell) is used for a vehicle, a compact generator and a domestic co-generation system since it operates at a lower temperature, produces a higher power density, and is expected to be compact and light and to have a shortened operation period.

The polymer electrolyte fuel cell uses a perfluorosulfonic acid based polymer membrane as a proton conductive solid electrolyte and operates at a temperature between 50° C. and 100° C. However, since the polymer electrolyte fuel cell operates at such a lower temperature, it is likely to be poisoned by an impurity contained in the reformed gas which is rich in hydrogen. Particularly, platinum used for an electrode in a fuel cell unit is likely to be poisoned by CO, and generation performance of the unit is degraded when CO is contained in the reformed gas beyond a certain predetermined concentration.

Thus, a CO removal unit is provided downstream a reforming unit which produces the reformed gas rich in hydrogen from the fuel, and CO is selectively converted and removed through a water gas shift reaction (CO+$H_2O \rightarrow CO_2+H_2$) so that a concentration of CO in the reformed gas is usually reduced to not greater than 1%. A catalyst for the water gas shift reaction is used for the CO removal as a CO conversion catalyst, and hitherto a Cu—Zn based catalyst has been conventionally used. It is noted that in the generation system using the polymer electrolyte fuel cell, a selective oxidation reaction unit is additionally provided downstream the CO removal unit so that the CO concentration in the hydrogen gas is further reduced for example to not larger then 50 ppm, and the hydrogen gas of which CO concentration is thus reduced is supplied to a fuel cell unit.

DISCLOSURE OF INVENTION

However, since an activity of the Cu—Zn based catalyst is low, a large amount of the catalyst has to be used in order that the CO concentration in the hydrogen gas is reduced to not larger than 1%. Further, its activity ages, and therefore the catalyst has be replaced with a fresh catalyst periodically. Therefore, it is difficult to apply the Cu—Zn based catalyst to a fuel cell generation system wherein start and stop are repeatedly carried out, and in particular to a compact fuel cell generation system.

The present invention has been made considering the problem as described above, and an object of the present invention is to provide a catalyst for a water gas shift reaction which can removes CO effectively in a hydrogen gas preferably within a broader temperature range and which can be used for the removal of CO contained in the hydrogen gas. Such catalyst can be used as a catalyst which accelerates a water gas shift reaction when CO is removed from a gas rich in hydrogen which is formed particularly in a fuel cell generation system.

Another object of the present invention is to provide a method for reducing carbon monoxide in a hydrogen gas in which method the hydrogen gas containing carbon monoxide contacts with the catalyst for the water gas shift reaction catalyst as described above.

A further object of the present invention is to provide a fuel cell generation system characterized in that a hydrogen gas which contains carbon monoxide contacts with the catalyst for the water gas shift reaction, and an obtained hydrogen gas of which carbon monoxide content is reduced is supplied to a fuel cell unit.

In the first aspect, the present invention provides a catalyst for a water gas shift reaction characterized in that at least platinum is supported as an active component on a metal oxide carrier.

In the catalyst according to the present invention, the metal oxide carrier is preferably at least one selected from the group consisting of zirconia, alumina, titania, silica, silica-magnesia, zeolite, magnesia, niobium oxide, zinc oxide and chromium oxide (it is to be noted that a metal herein includes also silicon). Among those oxides, zirconia is particularly preferable. Also, a carrier of zirconia, alumina, silica, silica-magnesia, zeolite, magnesia, niobium oxide, zinc oxide or chromium oxide coated with titania may be used as the metal oxide carrier.

As to the catalyst according to the present invention, an amount of the active component supported by the carrier is preferably between 0.1% by weight and 10.0% by weight converted into a platinum metal expression based on a weight of the carrier (that is, based on a weight of the carrier itself which does not include the active component, which is also applicable hereinafter to the amount of the a supported active component).

According to one embodiment, rhenium is supported as another active component in addition to platinum in the catalyst of the present invention. In this case, an amount of supported rhenium (converted into a rhenium metal expression) is preferably between 0.1% by weight and 10.0% by weight based on a weight of the carrier.

In a further embodiment, at least one other metal selected from the group consisting of yttrium, calcium, chromium, samarium, cerium, tungsten, neodymium, praseodymium, magnesium, molybdenum and lanthanum is further supported as a further active component in the catalyst of the present invention in addition to platinum and rhenium optionally present as described above. In this case, an amount of the further supported active component(s) (converted into a metal expression) is in total preferably between 0.1% by weight and 10.0% by weight based on a weight of the carrier.

As to the catalyst according to the present invention, any suitable manner may support the active component on the carrier. For example, a salt of a metal which is suitable for the active component is dissolved in a suitable solvent such as water, and thus obtained solution is mixed with the carrier (for example in a powder form) to produce a mixture (for example a slurry) before the mixture is dried (preferably dried by heating), so that the carrier is obtained as the catalyst for the water gas shift reaction on which carrier the active component is supported.

The obtained catalyst for the water gas shift reaction is preferably subjected to firing thereafter. In the present invention, firing means a treatment wherein the carrier on which the active component is supported is kept at an elevated temperature, and makes it possible to produce a catalyst of which activity is higher. For example, the carrier is kept at a temperature between 400° C. and 600° C. (for example, 500° C.) for a period between one hour and six hours (for example, two hours) in a suitable atmosphere (for example, in air or in an inert atmosphere).

In other embodiment, in place of or before firing, the catalyst for the water gas shift reaction which is produced by the above supporting is preferably subjected to a washing treatment. The washing treatment is carried out using water, preferably warm water and more preferably hot water (for example, boiling water). Concretely, the washing treatment is so carried out that the carrier which includes the active component thereon is dispersed in water which is agitated, and then the carrier is separated (for example, by filtration) followed by drying.

In the second aspect, the present invention provides a process of producing a catalyst for a water gas shift reaction which removes carbon monoxide in a hydrogen gas, which process comprises the steps of:

(1) producing a slurry by mixing a metal oxide carrier and a solution (preferably an aqueous solution) of a platinum salt, and (2) drying thus obtained slurry so as to obtain a dried carrier. According to this process, the catalyst for the water gas shift reaction according to the present invention as described above is produced.

The process according to the present invention may further comprise the step of (3) firing the dried carrier thus obtained. In another embodiment, in place of or before carrying out the firing step, the process may further comprise the step of (4) washing the obtained dried carrier or the fired carrier and particularly washing it with hot water. It is noted that in the process according to the present invention, the platinum salt is converted to platinum as the active component and supported during drying the slurry drying (step (2)), and further during the firing (step (3)) and/or during the washing (step (4)).

The explanations as to the catalyst of the present invention as described above are applicable to the metal oxide carrier, the amount of the supported platinum, the firing, and the washing and so on in the process of producing the catalyst according to the present invention. In addition, rhenium in addition to platinum may be supported by the carrier, in which a solution of a rhenium salt is used in place of the solution of the platinum salt.

As to supporting rhenium, rhenium together with platinum may be supported by the carrier, in which an aqueous solution containing both the rhenium salt and the platinum salt together is prepared (or an aqueous solution containing the platinum salt and an aqueous solution containing the rhenium salt are mixed), and the steps described above are carried out using the obtained solution (or the mixture). Alternatively, the above steps (1) and (2) in series are repeated twice wherein one component is supported first and the other component is supported subsequently so that the carrier is obtained which supports platinum and rhenium.

In the process according to the present invention, in addition to platinum or in addition to platinum and rhenium as the additional active component, at least one other metal as described above may be supported by the carrier as a further additional active component. In this case, all of the metals may be supported together or each of the metals may be supported separately as in the case of rhenium as described above. It is noted that as to amounts of rhenium and the other metal to be supported, the above explanations as to the catalyst of the present invention are applicable.

Further, in the third aspect, the present invention provides a method for removing carbon monoxide from a hydrogen gas containing carbon monoxide characterized in that the hydrogen gas is contacted with a catalyst for a water gas shift reaction which comprises a metal oxide carrier supporting at least platinum. As the catalyst for the water gas shift reaction in this method, the catalyst according to the present invention which is described above can be used.

In this method, the hydrogen gas which contains carbon monoxide is contacted with the catalyst for the water gas shift reaction which is retained by a proper means or manner at a temperature between 200° C. and 400° C. and preferably a temperature between 220° C. and 350° C. in the presence of steam. The steam may be supplied in any suitable manner. The hydrogen gas which is used in this method is not particularly limited as far as it contains carbon monoxide. For example, the method according to the present invention is preferably applied to a reformed gas which contains hydrogen as a main component, and also contains carbon monoxide and steam so that a concentration of carbon monoxide contained in the gas is reduced.

Thus, in the fourth aspect, the present invention provides a fuel cell generation system which comprises a CO removing unit which contains a catalyst for a water gas shift reaction comprising a metal oxide carrier which supports at least platinum, which system is characterized in that the CO removing unit contacts a reformed gas as a hydrogen gas containing carbon monoxide produced by a steam reforming unit with the catalyst for the water gas shift reaction, whereby the hydrogen gas of which carbon monoxide concentration has been reduced is produced. The hydrogen gas of which carbon monoxide concentration has been reduced is supplied to a fuel cell unit. It is noted that when thus reduced carbon monoxide concentration in the hydrogen gas has to be further reduced before the hydrogen gas is supplied to the fuel cell unit (for example in the case of the polymer electrolyte fuel cell generation system), the hydrogen gas of which carbon monoxide concentration has been reduced through the CO removing unit is passed through a selective oxidation unit before it is supplied to the fuel cell unit.

EMBODIMENT FOR CARRYING OUT THE INVENTION

Figure 1:
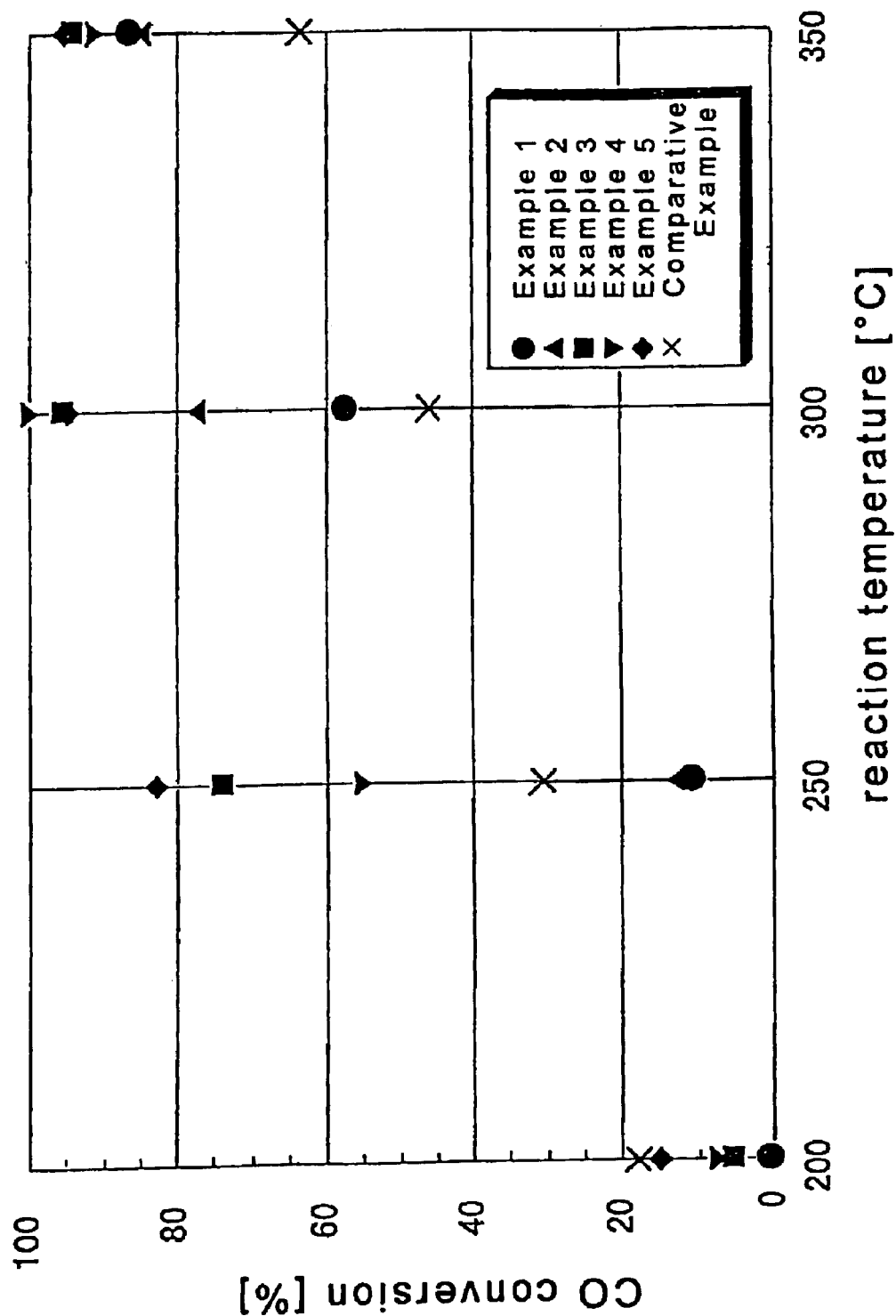
FIG. 1 is a graph which shows relationships between a reaction temperature and a CO conversion when catalysts according to Examples 1 to 5 and Comparative Example were used.

Embodiments according to the present invention will be explained hereinafter.

In the present invention, as the metal oxide which is the carrier for the active component, at least one selected from the group consisting of zirconia, alumina, silica, silica-magnesia, zeolite, magnesia, niobium oxide, zinc oxide, chromium oxide and these metal oxide coated with titania (for example those coated through CVD), and titania. Those metal oxides may be ones commercially available. The carrier may be in the form of powder or particles, or in the form of a shaped article such as a pellet.

Alternatively, the metal oxide as described above may be one which are produced from other compound(s) by any suitable method. For example, zirconia as the carrier may be prepared by firing a hydrate of zirconium hydroxide as a starting material.

Having platinum as the active component supported on such a carrier (for example a zirconia carrier) may be performed by adding the carrier into an aqueous solution of a platinum salt (for example chloroplatinic acid), evaporating the solution while stirring, and optionally further heating the material obtained through evaporating so as to dry it, whereby the catalyst for the water gas shift reaction according to the present invention is obtained. Optionally, when the material obtained through evaporating or further heating has a large size (for example when it is in the form of a mass, it may be pulverized. When necessary, the carrier supporting the active component may be subjected to the firing treatment optionally after the pulverization.

It is noted that when the obtained carrier is fine, it may be pressed to produce pellets using for example a press followed by pulverizing the produced pellets so as to produce catalyst particles having a diameter between 0.5 mm and 1.0 mm. Such carrier may be used as the catalyst for the water gas shift reaction wherein the active component is supported by the carrier, and CO contained in the hydrogen gas is removed using the particles.

As to the catalyst for the water gas shift reaction according to the present invention, a supported amount of platinum is in the range between 0.1% and 10% by weight based on the carrier weight. When the supported amount of platinum is less than 0.1% by weight, it is difficult to have a sufficient catalyst activity to convert CO in $H_2$ to $CO_2$ through the water gas shift reaction upon the removal of CO. When the supported amount of platinum is greater than 10.0% by weight, the catalyst activity is not so further improved and a production cost of the catalyst often becomes unprofitable.

The CO removing catalyst may be also obtained by having other active component supported on the carrier in addition to platinum. As such other active component, rhenium and yttrium, calcium, chromium, samarium, cerium, tungsten, neodymium, praseodymium, magnesium, molybdenum and lanthanum may be used. One or more metals selected from these metals may be supported on a zirconia carrier. When other active component(s) is supported, a salt of the selected active component is used in the supporting manner as described in the above.

Upon the preparation of the catalyst for the water gas shift reaction wherein the active component(s) in addition to platinum is supported on the carrier, when a metal(s) such as rhenium, and/or yttrium, calcium, chromium, samarium, cerium, tungsten, neodymium, praseodymium, magnesium, molybdenum and/or lanthanum is used as the active component, an aqueous solution of a platinum salt (such as chloroplatinic acid) and an aqueous solution(s) of a salt(s) of said other metal(s) (or an aqueous solution which contains these all salts together) are mixed with the carrier, and then the obtained mixture is evaporated while being stirred, and the material obtained through the evaporation is heated so as to further dry if necessary. A subsequent treatment thereafter may be similar to that in the case of having platinum supported as described before. When a plurality of the metals are supported on the carrier as described above, it is not particularly critical in which form the metals are supported on the carrier as long as the effect as to the water gas shift reaction is provided. Thus, the metals may be or may not be in a state of an alloy.

By having at least one selected from the above metals in addition to platinum supported on the carrier, the catalyst activity to remove CO is increased, and hydrogen consumption is because of methanation reaction simultaneously prevented. The methanation reaction in which CO reacts with $H_2$ to form methane occurs as a side reaction upon the conversion of CO in $H_2$ into $CO_2$ for the purpose of the removal of CO. Particularly, by having rhenium in addition to platinum supported, an effect to further increase the catalyst activity to remove CO is obtained.

In this case, a supported amount of rhenium is preferably in the range between 0.1% and 10.0% by weight converted into the rhenium m tal expression based on the carrier weight. As to the metal(s) other than rhenium, a supported amount of such metal(s) is preferably in the range between 0.1% and 10.0% by weight of the total of such metal(s). When the supported amount of such metal(s) is less than 0.1% by weight, it is difficult to have a sufficient effect to prevent the methanation reaction. When the supported amount of such metal(s) is greater than 10.0% by weight, the effect to prevent the methanation reaction is not so further improved and a production cost of the catalyst becomes unprofitable.

In the above description, the active component such as platinum is supported by adding the aqueous solution of the salt of the active component to the carrier followed by evaporating the solution, further heating to dry and then firing the carrier. However, the catalyst for the water gas shift reaction according to the present invention may be produced by washing and particularly washing with hot water the carrier after evaporating or further heating. That is, the catalyst comprising the carrier supporting platinum and optionally the other metal(s) is stirred in the hot water (at a temperature between 80° C. and 100° C., preferably boiling water) for a predetermined period (for example one hour) followed by filtration so as to separate the catalyst. After repeating such washing several times (and preferably until filtrate gets clear) and then drying, a catalyst is produced. Alternatively, the dried catalyst may be pressed into the form of pellets, and thus obtained pellets may be pulverized into particles having a diameter between 0.5 mm and 1.0 mm so that the catalyst for the water gas shift reaction wherein the carrier supports platinum is obtained. When washing, and particularly washing with the hot water is carried out as described above, the subsequent firing may be or may not be carried out.

By carrying out washing as described above, it is contemplated that what is present in the carrier and able to adversely affect the CO removal through the water gas shift reaction (for example, a material which is resulted from the carrier or the active component salt such as a chlorine ion) is reduced or removed from the carrier so that the catalyst activity to remove CO is further increased. For example, the adverse effect induces conversion degradation, selectivity degradation and increase of a by-product(s).

It is generally noted that when the water gas shift reaction is conducted while using the catalyst according to the present invention, the catalyst is preferably subjected to a reduction treatment prior to conducting the water gas shift reaction since the active metal may have been oxidized. The reduction treatment may be carried out in any suitable manner, and for example in a manner wherein the catalyst is contacted with hydrogen at an elevated temperature.

According to the present invention, the catalyst for the water gas shift reaction produced as described in the above is able to be used in a water gas shift reaction unit wherein CO is removed from a reformed gas which is rich in hydrogen and which is produced from a hydrocarbon based gas (such as a butane gas), a hydrocarbon liquid or solid, or an alcohol fuel such as methanol and steam through a steam reforming reaction unit. Such water gas shift reaction unit is combined with a selective oxidization unit (for example a unit comprising a Ru-based selective oxidation catalyst) which is located downstream the unit, so that the CO concentration of the reformed gas is reduced below a predetermined level, and such reformed gas is supplied to a fuel cell unit, whereby a fuel cell generation system for example, the polymer electrolyte fuel cell generation system is formed. Such system is optimal for an automobile, a compact generator or a domestic cogeneration system.

Industrial Applicability

The catalyst for the water gas shift reaction according to the present invention wherein the metal oxide carrier supports at least platinum is able to effectively remove CO in a hydrogen gas at a temperature within a broader temperature range for example between 200° C. and 400° C. so that it is easily applied to a compact and portable fuel cell generation system which repeats its start and stop operations.

When the metal oxide carrier is at least one selected from the group consisting of zirconia, alumina, silica, silica-magnesia, zeolite, magnesia, niobium oxide, zinc oxide and chromium oxide and these metal oxide coated with titania, and titania, the CO removing activity of the catalyst for the water gas shift reaction in which platinum is supported is effectively obtained. Among them, using zirconia as the carrier is in particular effective. In addition, when the supported amount of platinum is in the range between 0.1% by weight and 10% by weight based on the carrier weight, the CO removing activity from the reformed gas of the catalyst becomes further more effective.

The catalyst in which rhenium in addition to platinum is supported is able to enhance the CO removing activity of the catalyst and simultaneously to prevent the occurrence of the methanation reaction. In addition, when the supported amount of rhenium is in the range between 0.1% by weight and 10% by weight based on the carrier weight, the effect to prevent the methanation reaction is effectively achieved.

When the carrier supports, in addition to platinum or in addition to platinum and rhenium, at least one metal selected from the group consisting of yttrium, calcium, chromium, samarium, cerium, tungsten, neodymium, praseodymium, magnesium, molybdenum and lanthanum, it is possible to enhance the CO removing activity and simultaneously to prevent the occurrence of the methanation reaction. In addition, when the supported amount of those metals is in the range between 0.1% by weight and 10% by weight based on the carrier weight, the effect to prevent the methanation reaction is effectively achieved.

It is noted that the catalyst which is obtained by the washing treatment and particularly the washing treatment using the hot water after the active component has been supported has the enhanced activity, so that such catalyst is preferably used for the removal of CO from the hydrogen gas.

In addition, the reformed gas rich in hydrogen which is produced through the steam reforming reaction of a butane gas as a hydrocarbon based fuel with steam may be contacted with the catalyst for the water gas shift reaction according to the present invention, followed by being contacted with the Ru-based selective oxidation catalyst, so that thus obtained reformed gas may be supplied to the polymer electrolyte fuel cell, whereby using the reformed gas which is obtained from the fuel through the steam reforming reaction, through the water gas shift reaction and through the selective oxidation, electrically generation can be carried out by means of the fuel cell.

EXAMPLES

The present invention will be concretely explained with reference to examples.

Examples 1 to 5

Using a firing furnace, n-hydrate of zirconium hydroxide ($ZrO_2 \cdot H_2O$, manufactured by Mitsuwa Chemicals Co. Ltd.) was subjected to a firing treatment wherein it was heated to a temperature of 500° C. in one hour in an air flow of 60 ml/min., and kept at that temperature for one hour, and thereby zirconium oxide was obtained as a zircornia carrier.

A predetermined amount of the obtained zirconia carrier was charged into an evaporating dish located above a water bath. Pure water was added to the carrier and they are mixed intimately. An aqueous solution of chloroplatinic acid hexahydrate (manufactured by NACALAI TESQE INC.) was added to the evaporating dish, and pure water was further added to reach a predetermined concentration. The dish was located above the water bath while stirring so that the evaporation to dryness of the contents in the dish was carried out, during which a metal salt depositing on a wall of the evaporating dish was washed away with pure water into the bottom of the dish. Such depositing salt arose with the water evaporation. The evaporation to dryness took one hour.

The obtained material through the evaporation to dryness was further dried at a temperature of about 100° C. for at least 15 hours. The dried material was pulverized into powder in an agate mortar, and the powder was subjected to a firing treatment using a firing furnace wherein it was heated to a temperature of 500° C. in one hour in an air flow of 60 ml/min., and kept at that temperature for one hour.

Then, thus obtained powder was pressed at a pressure of about 3600 kg/cm² for 10 seconds using a manually operated press, and obtained pellets were pulverized into particles of which diameter was in the range between 0.5 mm and 1.0mm, whereby a catalyst for the water gas shift reaction was obtained which supported platinum of 3% by weight (based on the carrier weight) on the zirconia carrier.

It is noted that by variously changing a charged amount of the aqueous solution of chloroplatinic acid, catalysts for the water gas shift reaction ($Pt/ZrO_2$ catalysts) were produced of which supported amounts of platinum are different as shown in Table 1 below:

TABLE 1

|  | supported amount of platinum |
| --- | --- |
| Example 1 | 0.5% by weight |
| Example 2 | 1.0% by weight |
| Example 3 | 3.0% by weight |
| Example 4 | 5.0% by weight |
| Example 5 | 8.0% by weight |

As to the above catalysts according to Examples 1 to 5, their performances to remove CO were estimated as follows:

The catalyst (0.7 ml) was charged into a reaction tube, which was heated to a temperature of 500° C. in one hour and kept at that temperature for one hour while flowing hydrogen through the tube, so that a reduction treatment of the catalyst was carried out. Then, the temperature was lowered to 200° C. in one hour while flowing helium followed by stopping the flow of helium, and a CO containing gas in which $H_2O$ and CO was mixed in a molar ratio ($H_2O/CO$) of 1.3 was supplied to the tube at a condition of 3650 (1/hr) SV (space velocity) based on CO so that the water gas shift reaction was performed at a temperature of 200° C., whereby a CO removing experiment was initiated.

After the reaction got stable, gas samples were obtained at an inlet and an outlet of the tube, and analyzed by means of a gas chromatography (thermal conductivity detector) so that a conversion ratio of CO into $CO_2$ (CO conversion) was obtained. Further, the reaction temperature was elevated to 250° C., 300° C. and 350° C. Similarly to the above, samples were obtained after the reactions became stable, and analyzed whereby obtaining the CO conversions.

It is noted that a CO removing experiment as Comparative Example was also carried out similarly to Examples 1 to 5 except that a Cu/ZnO catalyst ("N211" manufactured by Nikki Chemical Co., Ltd.) was used and the reduction treatment was carried out at a temperature of 300° C. The results are shown in FIG. 1.

Next, aging of the catalysts was measured. This measurement was carried out as to the catalysts according to Examples 3 and 4 and Comparative Example. After carrying out the reduction treatment first as described above, the temperature of the reaction tube was lowered to 250° C. in one hour followed by stopping the helium supply, and the CO containing gas was supplied as in the above. After the reaction got stable, gas samples were obtained at the inlet and the outlet of the tube every 30 minutes, and analyzed by means of a gas chromatography so that CO conversions were obtained. The results are shown in FIG. 2.

It is seen from FIG. 1 that there is not so large difference in the catalysts between the Examples and Comparative Example at a temperature of 200° C., but the $Pt/ZrO_2$ catalyst of each Example (especially the catalyst having a larger supported amount) has a larger activity than the Cu/ZnO catalyst of Comparative Example. In addition, it is seen from FIG. 2 that the activity of Cu/ZnO catalyst of Comparative Example gradually decreases just after start of the experiment while the activity of $Pt/ZrO_2$ catalyst of Example 3 or 4 does not decrease.

Figure 2:
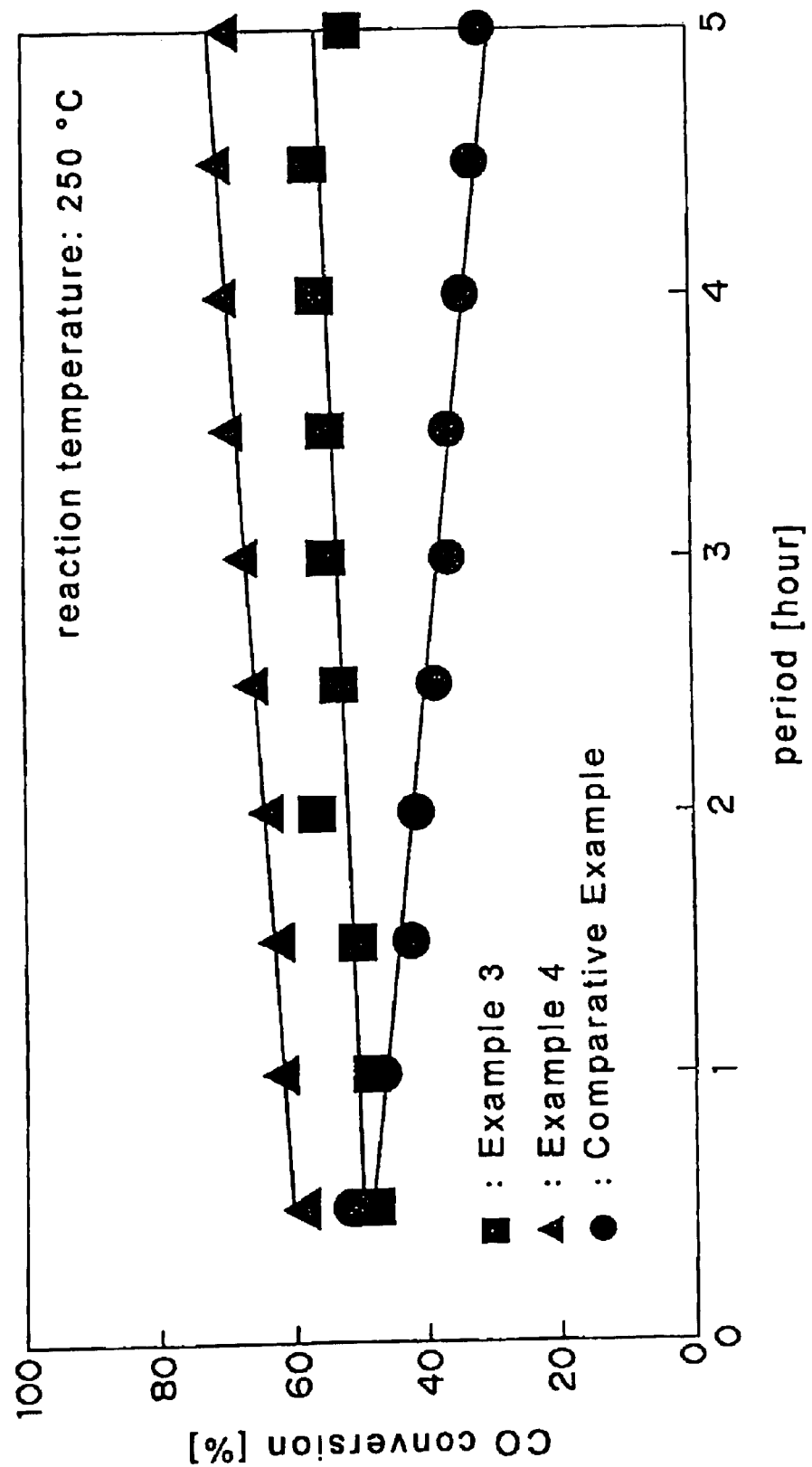
FIG. 2 is a graph which shows relationships between a reaction period and a CO conversion when catalysts according to Examples 3 and 4 and Comparative Example were used.

Therefore, it is contemplated that when considering FIGS. 1 and 2, the catalyst according to the present invention has a CO removing performance which is more effective than that of the catalyst of Comparative Example.

Example 6

A predetermined amount of the zirconia carrier which was prepared in Examples 1 to 5 was charged into an evaporating dish located above a water bath. Pure water was added to the carrier and they are mixed intimately. An aqueous solution of chloroplatinic acid hexahydrate (manufactured by NACALAI TESQE INC.) and an aqueous solution of lanthanum nitrate hexahydrate (manufactured by Wako Pure Chemicals Industries, Ltd.) were added to the evaporating dish, and pure water was further added to reach predetermined concentrations. The dish was located above the water bath while stirring so that the evaporation to dryness of the contents in the dish was carried out, during which metal salts depositing on a wall of the evaporating dish were washed away with pure water into the bottom of the dish. Such depositing salts arose with proceeding of the water evaporation. The evaporation to dryness took one hour.

The obtained material through the evaporation to dryness was further dried at a temperature of about 100° C. for at least 15 hours. The dried material was pulverized into powder in an agate mortar, and the powder was subjected to a firing treatment using a firing furnace wherein it was heated to a temperature of 500° C. in one hour in an air flow of 60 ml/min., and kept at that temperature for one hour, so that platinum was supported at in amount of 3.0% by weight (based on the carrier weight) and lanthanum was supported in an amount of 5.0% by weight.

Then, thus obtained powder was pressed at a pressure of about 3600 kg/cm² for 10 seconds using a manually operated press, and obtained pellets were pulverized into particles of which diameter was in the range between 0.5 mm and 1.0 mm, whereby a catalyst for the water gas shift reaction was obtained which supported platinum and lanthanum on the zirconia carrier.

Examples 7 to 16

Using a salt of a metal which is an active component as shown in Table 2 below in place of lanthanum nitrate hexahydrate, a catalyst for the water gas shift reaction was obtained wherein other metal shown in Table 3 below in addition to platinum was supported by the zirconia carrier.

TABLE 2

| Example | salt of active component | manufacturer |
| --- | --- | --- |
| Example 6 | lanthanum nitrate hexahydrate | Wako Pure Chemicals |
| Example 7 | praseodymium (III) nitrate hexahydrate | Wako Pure Chemicals |
| Example 8 | yttrium nitrate n-hydrate | Wako Pure Chemicals |
| Example 9 | neodymium (III) nitrate hexahydrate | Wako Pure Chemicals |
| Example 10 | calcium nitrate tetrahydrate | Wako Pure Chemicals |
| Example 11 | samarium nitrate hexahydrate | Wako Pure Chemicals |
| Example 12 | chromium (III) nitrate nonahydrate | NACALAI TESQE |

TABLE 2-continued

| Example | salt of active component | manufacturer |
|---|---|---|
| Example 13 | cerium (III) nitrate hexahydrate | NACALAI TESQE |
| Example 14 | magnesium nitrate hexahydrate | Wako Pure Chemicals |
| Example 15 | ammonium paratungstate pentahydrate | NACALAI TESQE |
| Example 16 | ammonium molybdate tetrahydrate | Kojund Kenkyusho |
| Example 17 | ammonium perrhenate | Mitsuwa Chemicals |

TABLE 3

| | supported amount of Pt (wt %) | other active component | supported amount (wt %) |
|---|---|---|---|
| Example 6 | 3.0 | lanthanum | 5.0 |
| Example 7 | 3.0 | praseodymium | 5.0 |
| Example 8 | 3.0 | yttrium | 5.0 |
| Example 9 | 3.0 | neodymium | 5.0 |
| Example 10 | 3.0 | calcium | 5.0 |
| Example 11 | 3.0 | samarium | 5.0 |
| Example 12 | 3.0 | chromium | 5.0 |
| Example 13 | 3.0 | cerium | 5.0 |
| Example 14 | 3.0 | magnesium | 5.0 |
| Example 15 | 3.0 | tungsten | 5.0 |
| Example 16 | 3.0 | molybdenum | 5.0 |
| Example 17 | 3.0 | rhenium | 1.0 |
| Example 18 | 3.0 | rhenium | 3.0 |

Figure 3:
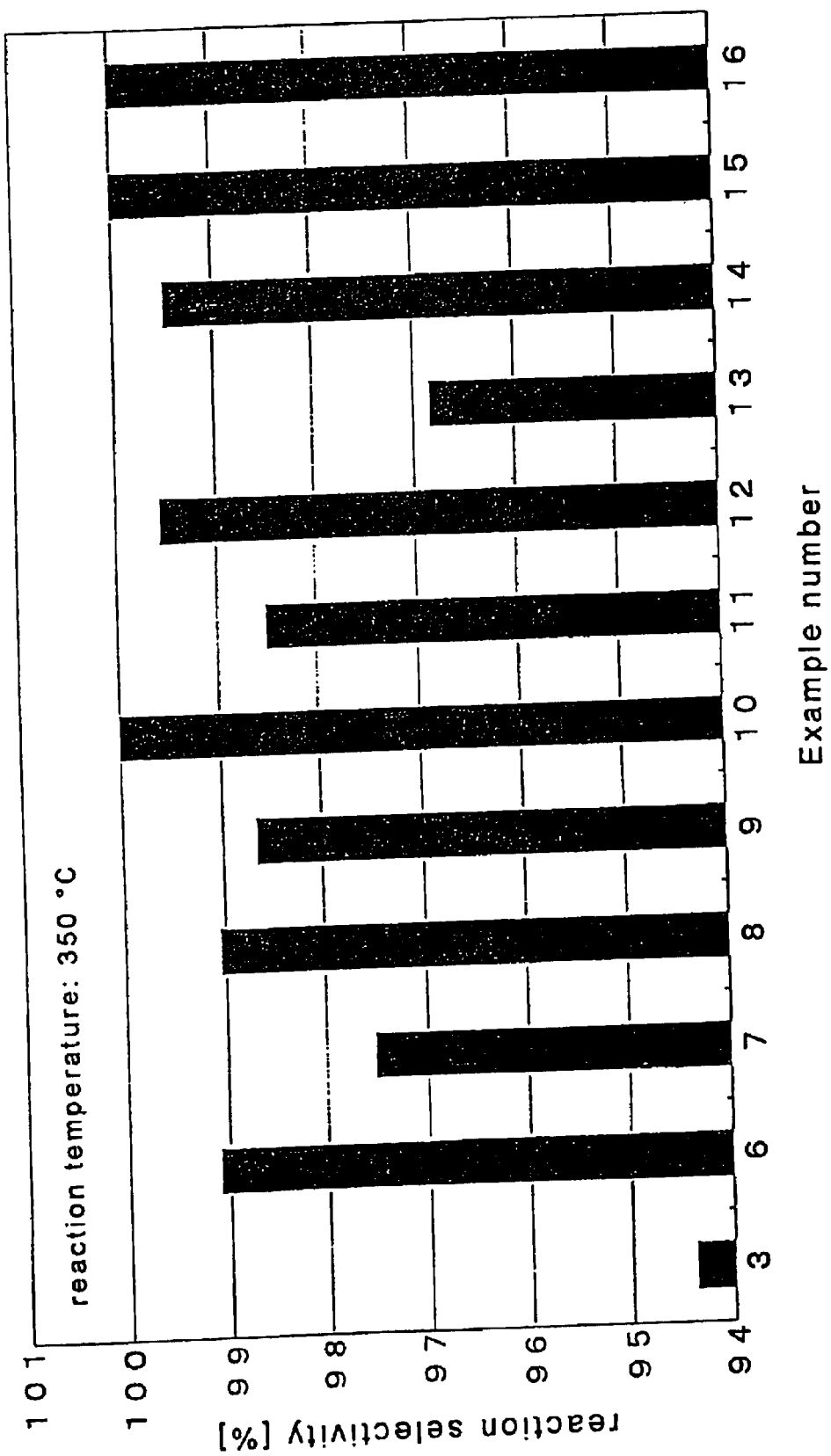
FIG. 3 is a graph which shows reaction selectivities when catalysts according to Example 3 and Examples 6 to 16 were used.

As to the catalysts according to Examples 6 to 16 and Example 3 prepared as described above, the CO removing experiments were carried out similarly to those as described above. The results are shown in FIG. 3. FIG. 3 shows a reaction selectivity which is a ratio of CO converted to $CO_2$, not to $CH_4$, upon the CO removal through the conversion of CO to $CO_2$ at a reaction temperature of 350° C., and it is seen that the catalysts according to Examples 6 to 16 have higher reaction selectivities than the catalyst according to Example 3 which supports only platinum.

Example 17

A predetermined amount of the zirconia carrier which was prepared in Examples 1 to 5 was charged into an evaporating dish located above a water bath. Pure water was added to the carrier and they are mixed intimately. An aqueous solution of ammonium perrhenate (manufactured by Mitsuwa Chemicals Co. Ltd.) was added to the evaporating dish, and pure water was further added to reach a predetermined concentration. The dish was located above the water bath while stirring so as to dry at a temperature of about 100° C. for at least 15 hours, during which a metal salt depositing on a wall of the evaporating dish were washed away with pure water into the bottom of the dish. Such depositing salt arose with proceeding of the water evaporation. As a result, rhenium was supported by the zirconia carrier.

Then, using the zirconia carrier supporting rhenium, platinum was supported by the carrier similarly to Examples 1 to 5, so that a catalyst for the water gas shift reaction was obtained wherein the zirconia carrier supported 3.0% by weight of platinum and 1.0% by weight of rhenium.

Example 18

Similarly to Example 17 except that an added amount of the aqueous solution of ammonium perrhenate (manufactured by Mitsuwa Chemicals Co. Ltd.) was changed, a catalyst for the water gas shift reaction was obtained wherein the zirconia carrier supported 3.0% by weight of platinum and 3.0% by weight of rhenium.

Figure 4:
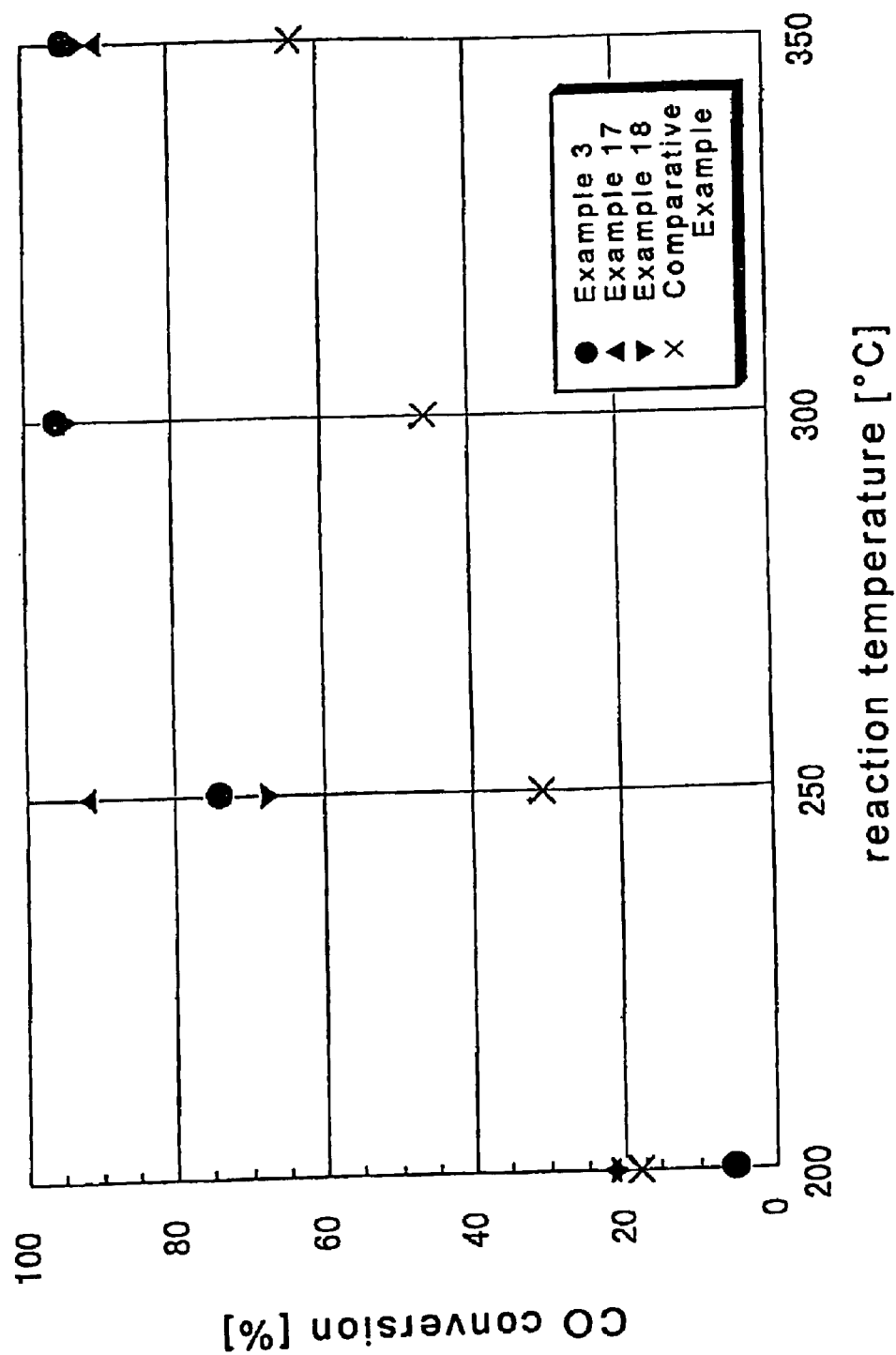
FIG. 4 is a graph which shows relationships between a reaction temperature and a CO conversion when catalysts according to Examples 3, 17 and 18 and Comparative Example were used.

As to the prepared catalysts of Examples 17 and 18 and Example 3 and Comparative Example, the CO removing experiments were carried out similarly to the above. The results are shown in FIG. 4. It is seen from FIG. 4 that the catalysts of Examples 17 and 18 have high activities, and they are highly active even at a temperature equal to or lower than 250° C.

Example 19

A predetermined amount of the zirconia carrier which was prepared in Examples 1 to 5 was charged into an evaporating dish located above a water bath. An appropriate amount of pure water was added to the carrier and they are mixed intimately. An aqueous solution of chloroplatinic acid (manufactured by NACALAI TESQE INC.) was added to the evaporating dish, and pure water was further added to reach a predetermined concentration. The dish was located above the water bath while stirring so that evaporation to dryness of the contents in the dish was carried out for one hour, during which a metal salt depositing on a wall of the evaporating dish were washed away with pure water into the bottom of the dish. Such depositing salt arose with proceeding of the water evaporation. The obtained material through the evaporation to dryness was dried dry at a temperature of about 100° C. for at least 15 hours.

The catalyst thus obtained was stirred in hot water (at a temperature of about 100° C.) for about one hour followed by settling and filtrating the catalyst. This process was repeated until the filtrate became clear. Then, the filtrated catalyst was dried at a temperature of 100° C. for at least 15 hours.

Then, thus obtained catalyst was pressed at a pressure of about 3600 kg/cm² for about 10 seconds using a manually operated press, and obtained pellets were pulverized into particles of which diameter was in the range between 0.5 mm and 1.0 mm, whereby a catalyst for the water gas shift reaction was obtained which supported platinum of 3.0% by weight on the zirconia carrier.

Figure 5:
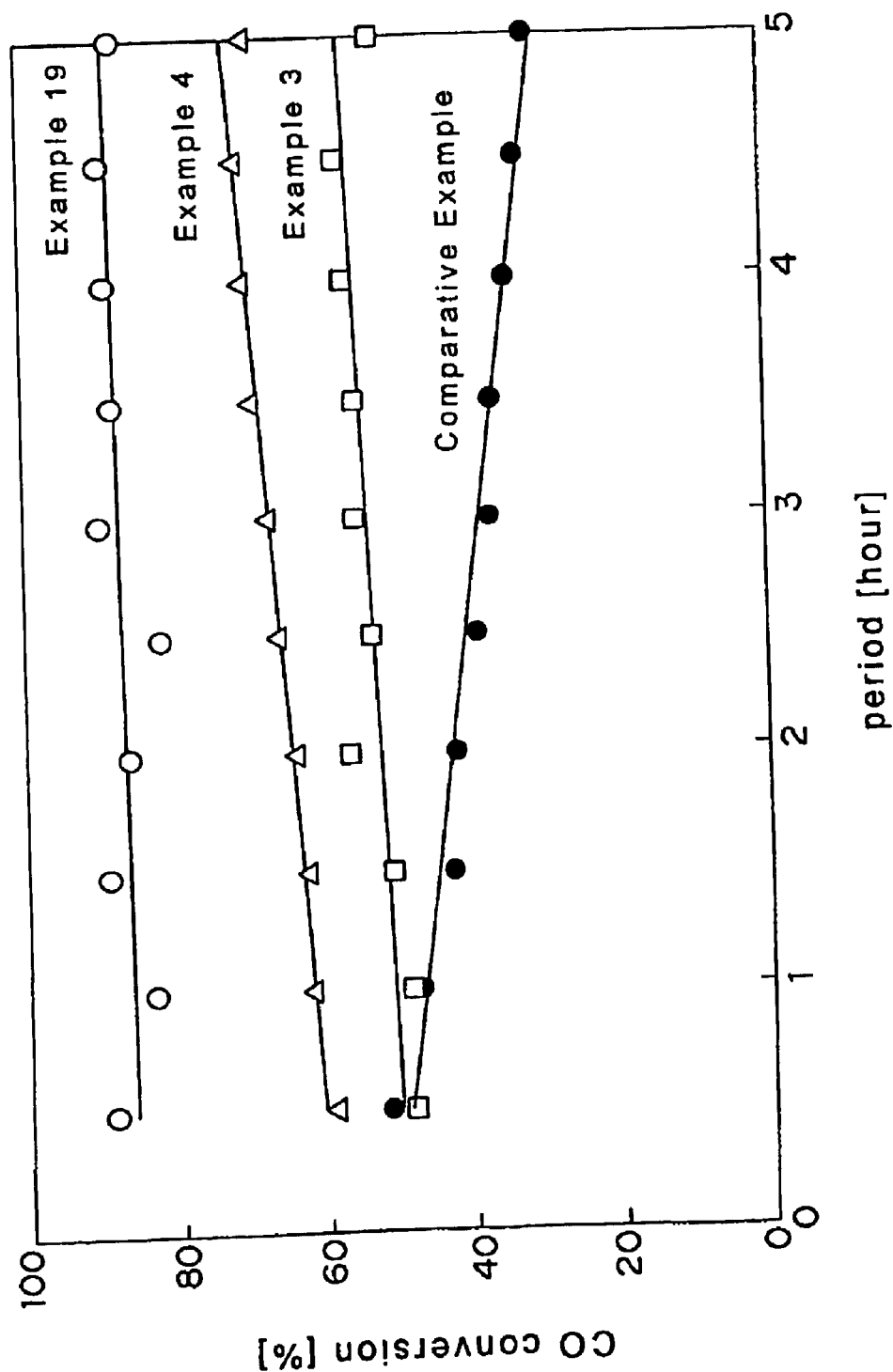
FIG. 5 is a graph which shows relationships between a reaction period and a CO conversion when catalysts according to Example 3, 4 and 19 and Comparative Example were used.

As to the prepared catalyst of Examples 19, the same activity aging experiment was carried out similarly to the experiments as to the catalysts of Examples 3 and 4 and Comparative Example. The results are shown in FIG. 5. It is seen from FIG. 5 that the catalyst of Example 19 has a further higher activity than of course the catalyst of Comparative Example or the catalyst of Example 3 or 4, and that similarly to the catalysts of Examples 3 and 4, the activity of the catalyst of Example 19 does not degrade. Examples 20 to 27

Using a firing furnace, an agent shown in Table 4 below was subjected to a firing treatment wherein it was heated to a temperature of 500° C. in one hour in an air flow of 60 ml/min., and kept at that temperature for one hour, and thereby a carrier of each of Examples 20 to 27 was prepared.

A predetermined amount of the obtained each carrier was charged into an evaporating dish located above a water bath. Pure water was added to the carrier and they are mixed intimately. An aqueous solution of chloroplatinic acid hexahydrate (manufactured by NACALAI TESQE INC.) was added to the evaporating dish, and pure water was further added to reach a predetermined concentration. The dish was located above the water bath while stirring so that the evaporation to dryness of the contents in the dish was carried out, during which a metal salt depositing on a wall of the evaporating dish was washed away with pure water into the bottom of the dish. Such depositing salt arose with the water evaporation. The evaporation to dryness took two hours.

The obtained material through the evaporation to dryness was further dried at a temperature about 100° C. for at least 15 hours. The dried material was pulverized into powder in an agate mortar, and the powder was subjected to a firing treatment wherein it was heated to a temperature of 500° C. in one hour in an air flow of 60 ml/min., and kept at that temperature for one hour.

Then, thus obtained powder was pressed at a pressure of about 3600 kg/cm$^2$ for 10 seconds using a manually operated press, and obtained pellets were pulverized into particles of which diameter was in the range between 1.4 mm and 2.0 mm, whereby a catalyst for the water gas shift reaction was obtained. The catalyst of each Example supported 3% by weight of platinum.

TABLE 4

| Example | feedstock for carrier | manufacturer |
| --- | --- | --- |
| Example 20 | alumina | NACALAI TESQE INC. |
| Example 21 | titania | reference catalyst of Catalysis Society |
| Example 22 | silica | Davison Inc. |
| Example 23 | magnesia | KANTO KAGAKU |
| Example 24 | niobium oxide | NACALAI TESQE INC. |
| Example 25 | zinc oxide | NACALAI TESQE INC. |
| Example 26 | chormium oxide | NACALAI TESQE INC. |
| Example 27 | zeolite | reference catalyst of Catalysis Society |

As to the catalysts for the water gas shift reaction of Example 3 and 20 to 27, the CO removal performances were estimated. The estimation experiments were carried out as follows:

First, 3.3 ml of the catalyst for the water gas shift reaction was charged in to a reaction tube, and H$_2$O and a gas mixture which contained H$_2$ (70%), CO (10%), CO$_2$ (15%) and CH$_4$ (5%) were supplied to the tube under conditions of a molar ratio (H$_2$O/CO) of 7.5 and SV (based on the gas mixture) of 5000 (1/hr). The reaction for the CO removal started at a temperature of 250° C.

After the reaction got stable, a sample was obtained from an outlet of the reaction tube, and analyzed using gas chromatography (thermal conductivity detector and flame ionization detector), whereby the conversion of CO to CO$_2$ was obtained.

Figure 6:
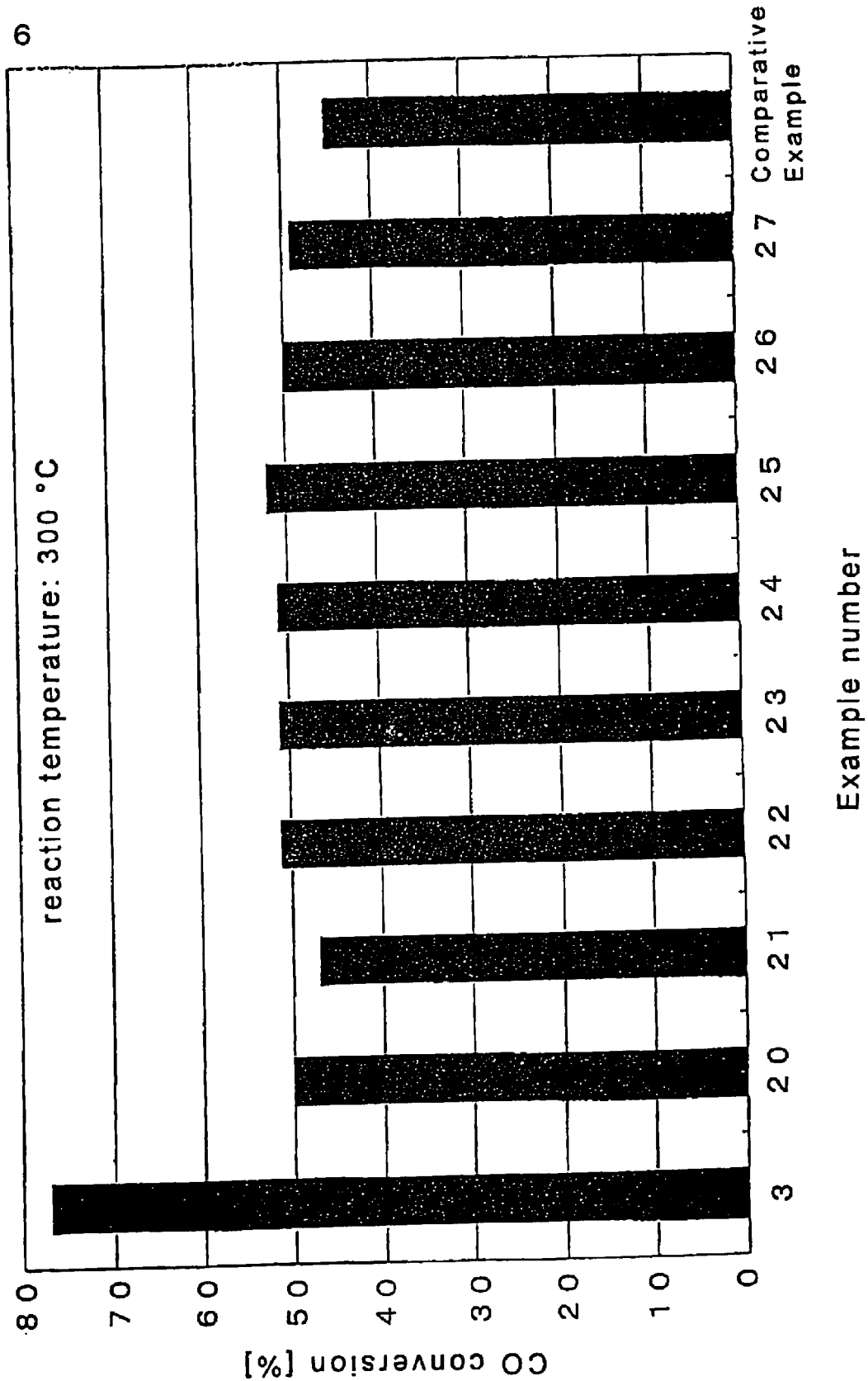
FIG. 6 is a graph which shows CO conversions when catalysts according to Examples 3 and 20 to 27 and Comparative Example were used.

The results are shown in FIG. 6. It is seen from FIG. 6 that the activity of the catalyst of each Example is higher than that of the Cu/ZnO catalyst of Comparative Example.

Example 28

Using the catalyst for the water gas shift reaction according to Example 17, the CO removing performance from a hydrogen gas which contained carbon monoxide was estimated. Experiments for the evaluation were carried out similarly to those as to the catalysts of Examples 20 to 27. It is noted that the similar CO removal experiments were carried out using the Cu/ZnO catalyst as Comparative Example.

Figure 7:
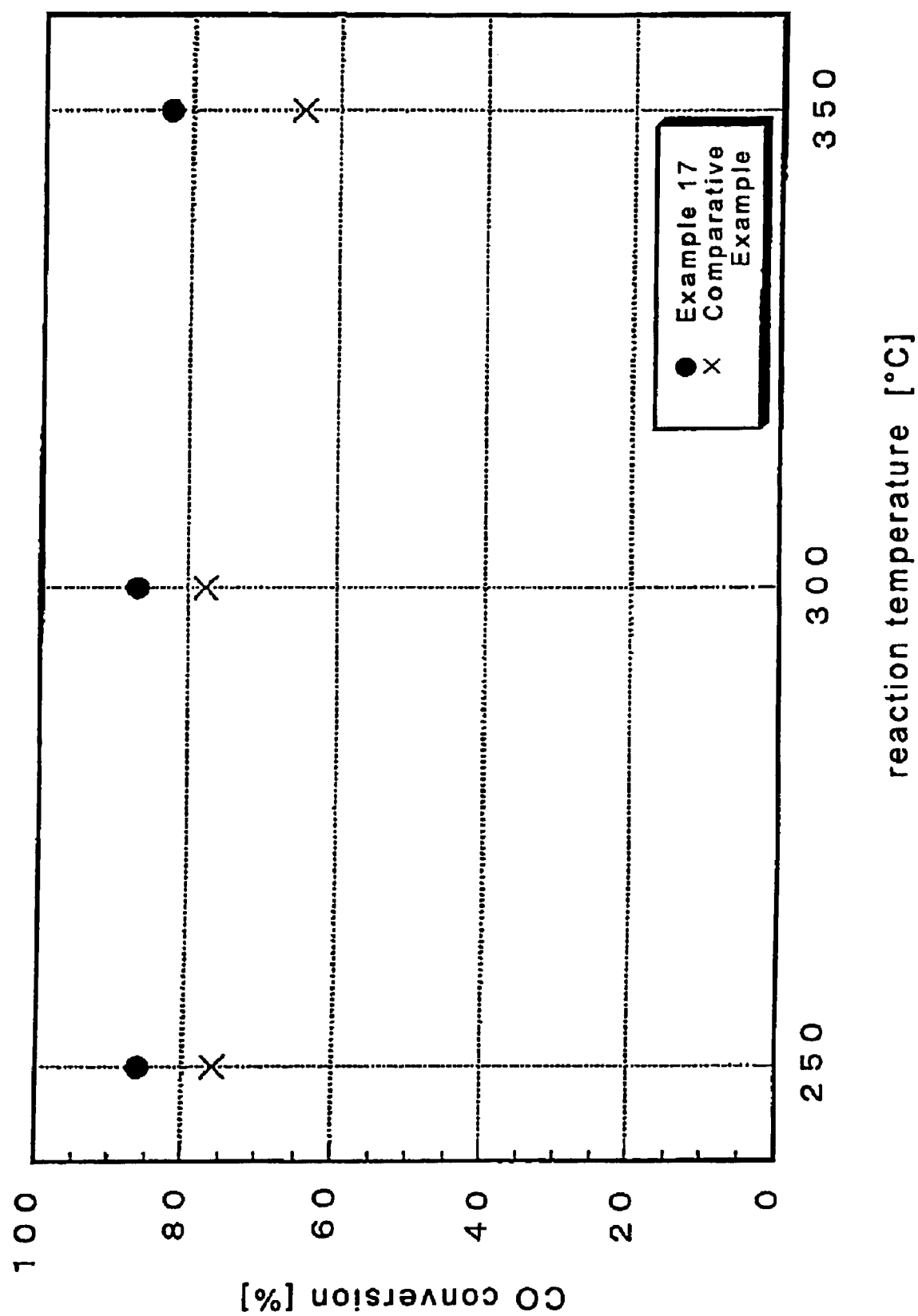
FIG. 7 is a graph shows relationships between a reaction temperature and a CO conversion when catalysts according to Example 17 and Comparative Example were used in Example 28.

The results are shown in FIG. 7. It is seen from FIG. 7 that the CO removal of Example 28 shows a further higher CO removal compared with the Comparative Example.

Example 29

A reformed gas rich in hydrogen which was produced from a butane gas as a hydrocarbon based fuel and steam through the steam reforming reaction was contacted with the catalyst for the water gas shift reaction according to Example 17, and then contacted with an Ru-based selective oxidation catalyst, and thus obtained reformed gas was supplied to a polymer electrolyte fuel cell. An amount of the reformed gas supplied to the fuel cell was 11.6 liters/min. according to an integrating flowmeter, and electricity generation of the fuel cell was estimated using an electronically loading device (electronic load device).

Generation performance of the fuel cell is shown in the following table:

| current | voltage | electric power generation |
| --- | --- | --- |
| 20 amperes | 16.8 volts | 336 watts |

As seen from the above table, it is confirmed that in the fuel cell system of Example 29 the electricity generation is possible by means of the fuel cell using the reformed gas obtained by the steam reforming reaction of the fuel and through the water gas shift reaction and the selective oxidation reaction.

What is claimed is:

1. A method for removing carbon monoxide from a hydrogen gas, comprising:
    contacting said hydrogen gas which contains carbon monoxide with a catalyst for a water gas shift reaction said catalyst comprising at least platinum and rhenium, both supported on a metal oxide carrier.

2. The method according to claim 1, wherein said catalyst further comprises at least one metal selected from the group consisting of yttrium, calcium, chromium, samarium, cerium, tungsten, neodymium, praseodymium, magnesium, molybdenum and lanthanum supported on said metal oxide carrier.

3. The method according to claim 2, wherein an amount of said metal is from 0.1% to 10% by weight based on a weight of said metal oxide carrier.

4. The method according to claim 1,
    wherein said metal oxide carrier is selected from the group consisting of zirconia, alumina, titania, silica-magnesia, zeolite, magnesia, niobium oxide, zinc oxide and chromium oxide.

5. The method for removing carbon monoxide according to claim 1, wherein an amount of said platinum is from 0.1% to 10% by weight based on a weight of the metal oxide carrier.

6. The method according to claim 1, wherein an amount of said rhenium is from 0.1% to 10% by weight based on a weight of the metal oxide carrier.

7. The method according to claim 1, wherein said catalyst has been subjected to water treatment at a temperature between 80 to 100° C.

8. The method according to claim 1, wherein a carbon monoxide concentration of said hydrogen gas after contacting said catalyst is not larger than 1%.

9. A fuel cell generation system, comprising:
    a hydrogen gas which contains carbon monoxide in contact with a catalyst for a water gas shift reaction comprising at least platinum and rhenium, both supported on a metal oxide carrier so as to remove carbon monoxide from the hydrogen gas.

10. The fuel cell generation system according to claim 9, wherein said catalyst further comprises at least one metal selected from the group consisting of yttrium, calcium, chromium, samarium, cerium, tungsten, neodymium, praseodymium, magnesium, molybdenum and lanthanum supported on said metal oxide carrier.

11. The fuel cell generation system according to claim 10, wherein an amount of said metal is from 0.1% to 10% by weight based on a weight of the metal oxide carrier.

12. The fuel cell generation system according to claim 9, wherein said metal oxide is at least one metal oxide selected from the group consisting of zirconia, alumina, titania, silica, silica-magnesia, zeolite, magnesia, niobium oxide, zinc oxide and chromium oxide.

13. The fuel cell generation system according to claim 9, wherein an amount of said platinum is from 0.1% to 10% by weight based on a weight of the metal oxide carrier.

14. The fuel cell generation system according to claim 9, wherein an amount of said rhenium is from 0.1% to 10% by weight based on a weight of said metal oxide carrier.

15. The fuel cell generation system according to claim 9, wherein said catalyst has been subjected to water treatment at a temperature between 80 to 100° C.

16. The fuel cell generation system according to claim 9, wherein a carbon monoxide concentration of said hydrogen gas which is supplied to said fuel cell is not larger than 1%.

* * * * *

UNITED STATES PATENT AND TRADEMARK OFFICE
CERTIFICATE OF CORRECTION

PATENT NO. : 6,777,117 B1
DATED : August 17, 2004
INVENTOR(S) : Akira Igarashi et al.

It is certified that error appears in the above-identified patent and that said Letters Patent is hereby corrected as shown below:

Title page,
Item [56], References Cited, U.S. PATENT DOCUMENTS, add:
-- 6,468,480 B1    10-22-02    Clawson et al       422/211
   5,604,047      02-18-97    Bellows et al       429/17
   6,548,029 B1   04-15-03    Towler et           422/211
   6,299,994 B1   10-09-01    Towler et al        429/17
   6,280,864 B1   08-28-01    Towler et al        429/17
   6,440,594 B1   08-27-02    Kindler et al       429/13
   6,162,267      12-19-00    Priegnitz et al     429/17
   6,420,059 B1   07-16-02    Surampudi et al     429/17 --
FOREIGN PATENT DOCUMENTS, "EP 0 833 402" should be -- EP 0 833 401 --; and "KR 1998-024098" should be -- KR 1998-024908 --.

Signed and Sealed this

Twenty-ninth Day of March, 2005

JON W. DUDAS
*Director of the United States Patent and Trademark Office*